No. 865,152. PATENTED SEPT. 3, 1907.
J. ARCOREN.
VEHICLE SEAT LOCK.
APPLICATION FILED JAN. 15, 1907.
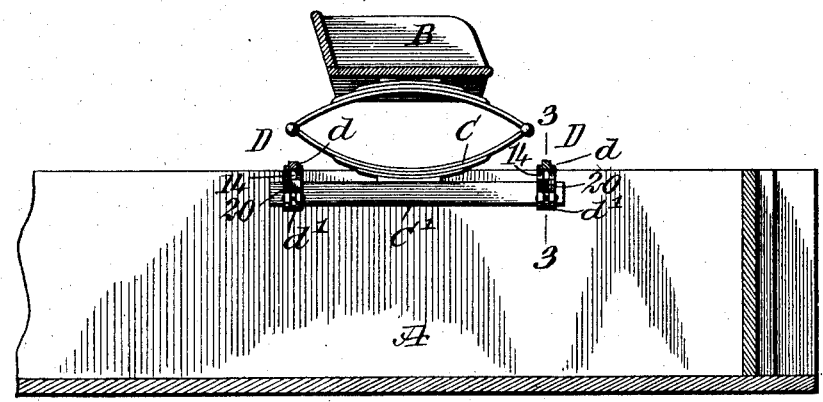
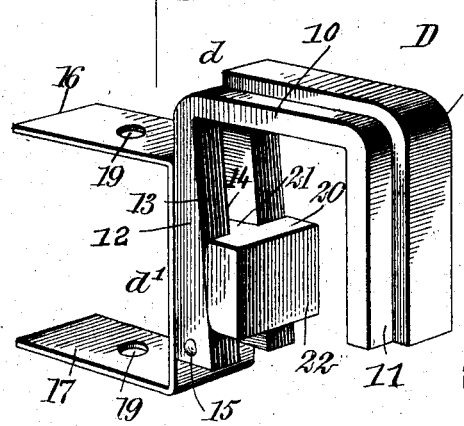 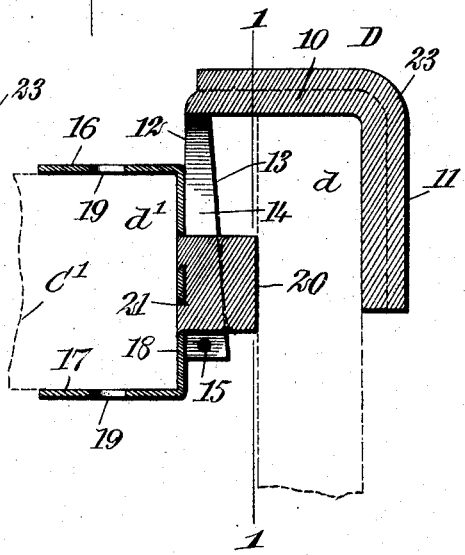
WITNESSES
INVENTOR
John Arcoren
BY
ATTORNEYS

UNITED STATES PATENT OFFICE.

JOHN ARCOREN, OF ROSEBUD, SOUTH DAKOTA.

VEHICLE-SEAT LOCK.

No. 865,152.  
Specification of Letters Patent.  
Patented Sept. 3, 1907.

Application filed January 15, 1907. Serial No. 352,336.

*To all whom it may concern:*

Be it known that I, JOHN ARCOREN, a citizen of the United States, and a resident of Rosebud, in the county of Meyer and State of South Dakota, have invented a new and useful Improvement in Vehicle-Seat Locks, of which the following is a full, clear, and exact description.

The purpose of the invention is to provide a device for holding the seats of a vehicle upon the body thereof, which device is simple, durable and capable of being readily secured to a seat and is so constructed as to receive the upper edge portion of a wagon box and to automatically lock itself thereto when the seat is occupied.

A further purpose of the invention is to so construct the device that the springs of the seat are held in position for the most effective service, and so that the device will not allow the seat to slip forward or backward nor jump from place, and yet wherein by simply lifting the seat the locks connected therewith will be instantly disconnected from the vehicle body.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a longitudinal section through a portion of a wagon box, the improved locks appearing in section, the sections being taken practically on the line 1—1 of Fig. 3; Fig. 2 is a perspective view of one of the improved locks drawn upon an enlarged scale; and Fig. 3 is a section through one of the locks taken practically on the line 3—3 of Fig. 1.

A represents a portion of a wagon box, B the seat therefor, C one of the elliptical springs for the seat, C' one of the supporting bars for the said elliptical springs, and D represents the locks employed in connection with the seat. Each lock D is of the same construction and consists practically of two members, namely; a supporting member $d$ and a bracket member $d'$. Each member is made of metal, and the supporting member $d$ of a lock is of substantially inverted U-shaped formation, comprising an upper horizontal member 10 and downwardly extending legs 11 and 12. The space between the legs of the supporting member $d$ is greater than the thickness of a side board of the wagon box. The supporting members $d$ are adapted to be placed over the upper edge of a side board, the legs 11 and 12 extending down at opposite sides of the side board, as is shown particularly in Fig. 3.

The inner face of the outer leg 11 of a supporting member $d$ is straight, but the inner face of the opposing leg 12 of a supporting member $d$ is inclined downwardly and outwardly, as particularly shown at 13 in Figs. 2 and 3, so that the inner legs 12 are wider at their lower ends than at their upper ends. The inner leg 12 of each supporting member $d$ is provided with a longitudinal or vertical slot 14 that extends from the upper portion of the said inner leg through its lower end, and a pin 15 is passed through the lower portion of the inner leg 12 of a supporting member $d$ crossing the slot 13 therein.

With reference to the bracket member $d'$, it consists of parallel upper and lower sections 16 and 17, and a connecting section 18, the connecting section 18 being placed in engagement with the straight face of the inner leg 12 of the supporting member $d$. The bracket member $d'$ is adapted to have sliding relation relatively to the supporting member $d$ and the connection between the two members is effected through the medium of a button 20 preferably of rectangular shape, which button is provided with a shank 21 that is connected in any suitable or approved manner with the connecting section 18 of the bracket member $d'$ about centrally between the ends of the said connecting section.

The button 20 is provided with an inclined inner face that engages with the inclined face or surface 13 of the inner leg 12 of the supporting member $d$. The outer face 22 of the said button 20 being straight and the straight outer face of a button is adapted, when the lock is in position on the wagon box to engage with the inner face of the side board of the box over which the lock is placed, as is clearly shown in Fig. 3.

The supporting member $d$ is usually reinforced by means of a rib 23 that extends longitudinally along the outer leg 11 and along the top portion 10. In applying the locks the end portions of the supporting bars C' for the seat are received between the upper and lower sections 16 and 17 of the bracket members $d'$ and bolts or their equivalents are passed through openings 19 in the said top and bottom sections of the bracket members and through the said bars.

Two of the devices only need be employed in connection with a seat but preferably four are used, one at each end of each supporting bar C' for the seat. In operation, when the locks are placed in engagement with the upper portions of the side pieces of a wagon box they loosely fit thereon, but the moment that the seat is occupied the weight of the occupant forces the bracket members $d'$ downward, causing the button 20 to travel down the inclined planes 13 at the outer faces of the inner leg 12 of the supporting members $d$, and as the buttons 20 reach the lower portions of the said inclined planes they are jammed against the inner faces of the side pieces of the wagon box thus holding the seat firmly in engagement with said box, yet when it is desired to remove the seat it can be quickly accomplished by simply lifting the seat upward.

Having thus described my invention, I claim as new and desire to secure by Letters Patent,—

1. A lock for vehicle seats comprising a supporting member and a bracket member slidably mounted upon the supporting member, and a projection from the bracket member that moves in an outwardly direction as the bracket is carried to a low position.

2. A vehicle seat and a lock therefor comprising a supporting member and a slidably connected bracket member, and a button carried by the bracket member extending within the supporting member, the opposing and engaging faces of the button and the supporting member being oppositely inclined.

3. A lock for vehicle seats consisting of a substantially inverted U-shaped supporting member, the inner leg whereof is provided with a longitudinal slot and a downwardly and outwardly inclined outer face, a bracket member, a button attached to the bracket member, the shank whereof extends through the slot in the inner leg of the supporting member, the inner face of the button being inclined for engagement with the inclined surface of the supporting member.

4. In a lock for vehicle seats, the combination with an inverted U-shaped supporting member, the inner leg whereof is provided with a longitudinal slot and with an inclined outer face, said leg being widest at its lower end, of a seat support, a bracket secured to said support, a shank extending from said bracket through the slot in the inner leg of the supporting member, and a button formed at the outer end of said shank, the inner face of which button is inclined correspondingly to the inclined surface of the inner leg of the supporting member.

In testimony whereof I have signed my name to this specification in the presence of two subscribing witnesses.

JOHN ARCOREN.

Witnesses:
S. I. GUISER,
H. E. MARLATT.